United States Patent [19]
Altmann et al.

[11] Patent Number: 5,112,117
[45] Date of Patent: May 12, 1992

[54] VEHICLE BRAKE SYSTEM WITH ANTI-SKID APPARATUS

[75] Inventors: Rainer Altmann, Erligheim; Rainer Lauer, Muenchingen; Guenther Schmidt, Tamm-Hohenstange; Kasimir Stromski, Filderstadt; Anton van Zanten, Ditzingen-Schoeckingen; Harald Hellmann, Ludwigsburg; Karl Veil, Uhingen; Hans-Joerg Fees, Bietigheim-Bissingen; Wolf-Dieter Jonner, Beilstein Schmidhausen; Reinhard Gutzeit, Stuttgart, all of Fed. Rep. of Germany

[73] Assignee: Robert Bosch GmbH, Stuttgart, Fed. Rep. of Germany

[21] Appl. No.: 651,821

[22] Filed: Feb. 7, 1991

[30] Foreign Application Priority Data

Feb. 13, 1990 [DE] Fed. Rep. of Germany ....... 4004315

[51] Int. Cl.⁵ .......................... B60T 8/58; B60T 13/68
[52] U.S. Cl. .......................... 303/116 R; 303/DIG. 4; 303/119 R
[58] Field of Search ...... 303/116 R, DIG. 5, DIG. 6, 303/84.1, 84.2, DIG. 1, DIG. 2

[56] References Cited

U.S. PATENT DOCUMENTS

| | | | |
|---|---|---|---|
| 4,703,979 | 11/1987 | Nakanishi et al. | 303/116 R |
| 4,778,226 | 10/1988 | Brown | 303/116 R |
| 5,013,097 | 5/1991 | Gutzeit et al. | 303/116 R |

Primary Examiner—Joseph F. Peters, Jr.
Assistant Examiner—Anne E. Bidwell
Attorney, Agent, or Firm—Edwin E. Greigg; Ronald E. Greigg

[57] ABSTRACT

A vehicle brake system comprising a hydraulically controllable 2/2-way valve, which has a first control inlet and a second control inlet. The first control inlet receives its control pressure from a first brake pressure source, while the second control inlet contrarily receives its control pressure from a second brake pressure source, such as a so-called return pump apparatus. The vehicle brake system can be used in passenger cars, vans, small buses, and small trucks as well as motor cycles.

14 Claims, 4 Drawing Sheets

VEHICLE BRAKE SYSTEM WITH ANTI-SKID APPARATUS

BACKGROUND OF THE INVENTION

The invention is based on a vehicle brake system as defined hereinafter.

In a vehicle brake system of this generic type, known from U.S. Pat. No. 4,778,226 a so-called brake pressure source selection valve is embodied as a 3/2-way electromagnet valve, and has an electric circuit for controlling the valve. The electric circuit is connected to at least two piston position switches; these switches are actuatable by pistons of a first and second pressure fluid holder. Producing this electromagnet valve, its connection cables and its electrical control is disadvantageously expensive in terms of engineering effort. There is also the disadvantage that the piston seals of the second pressure fluid holder are exposed to high pulsating pressures only during occasional anti-skid operation, and between these times tend to seize and then wear during anti-skid operation.

OBJECT AND SUMMARY OF THE INVENTION

The vehicle brake systems defined herein have an advantage of dispensing with the engineering expense for an electromagnetic actuation of the brake pressure source selection valve and for piston position switches and an electrical circuit that evaluates the signals of these switches.

With the provisions set forth, further advantageous embodiments of these systems are possible. The system defines an advantageous design of a hydraulically controllable 2/2-way valve for adequately safe operation during anti-skid operation, on the one hand, and accordingly for comfortable performance of the vehicle brake systems as well. The system has a further advantage that the second pressure fluid holder makes do without moving parts such as pistons with seals or diaphragms and therefore is especially functionally reliably and economical. Another advantage is that the second pressure fluid holder can for instance be embodied as a cavity made in a housing block during a casting process or the like. The other characteristics suggest dimensions that make an advantageous compromise for medium-price vehicles in term of engineering effort on the one hand and convenience in use of the vehicle brake system in the anti-skid mode on the other. These characteristics have an advantage of improved control of the brake pressure source selection valve its blocking position and that during pressure elevation events, brake pressure increases in at least one wheel brake are attainable by means of pressure fluid from the second pressure fluid holder and/or the operating return pump, which increases promote fast control of brake slippage to an optimal slip value, in other words avoid so-called overswings and as a result improve both the comfort of the ride and safety. A further advantage is that the return pump pressure beyond which the return pump is protected against being loaded further is independent of the pressure that is set by the driver upon actuation of the brake pedal.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
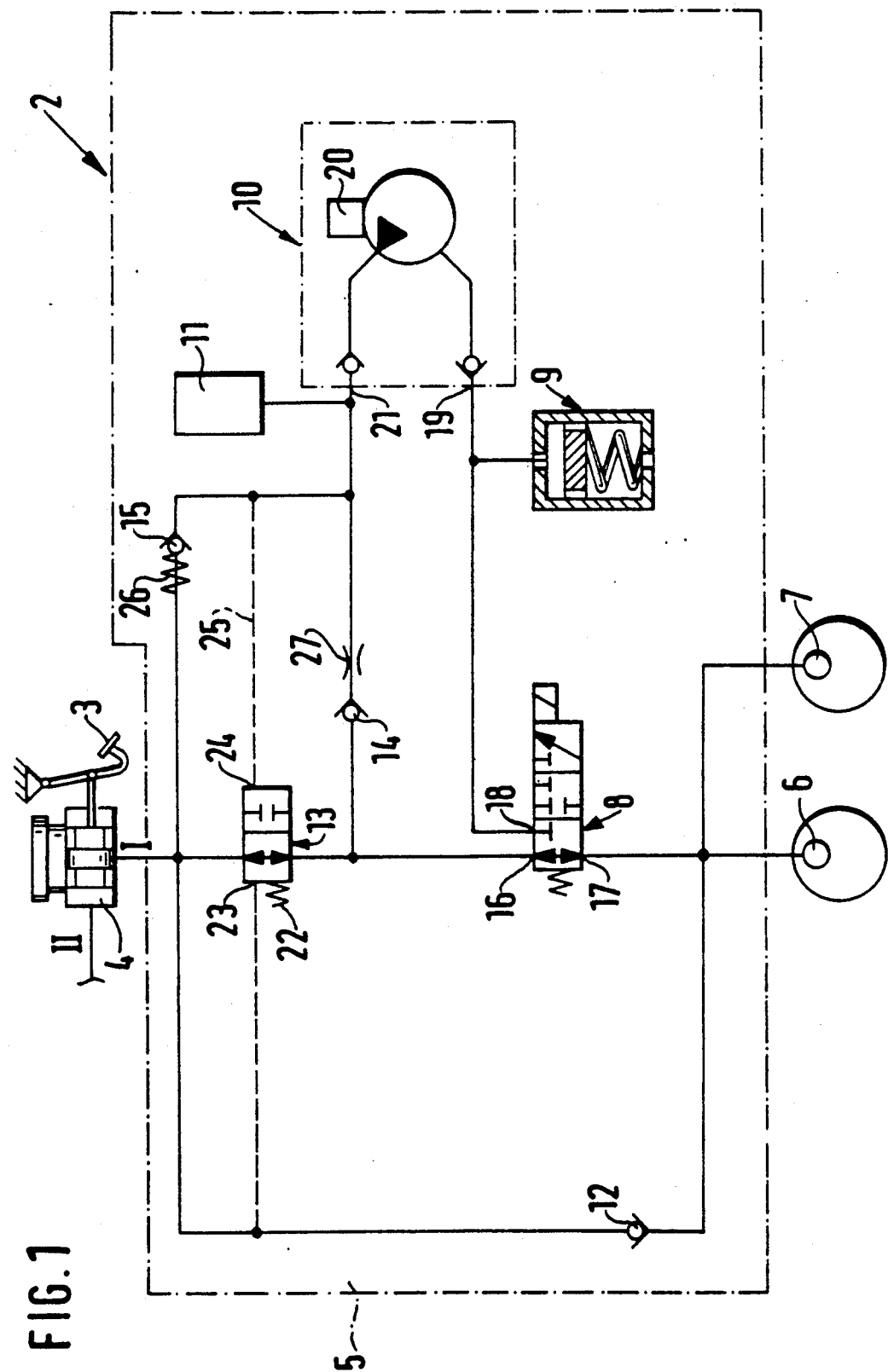
FIG. 1 schematically shows a vehicle brake system, the anti-skid apparatus of which, belonging to one brake circuit, is embodied for collective brake pressure variation in two wheel brakes.

The first exemplary embodiment of the vehicle brake system 2 according to the invention, shown in FIG. 1, has a first brake pressure source, controllable by means of a brake pedal 3 and embodied as a master brake cylinder 4, for two brake circuits I and II, and also, at least for brake circuit I, has an anti-skid apparatus 5 for conditionally supplying pressure fluid and pressure from the first brake pressure source 4 to two wheel brakes 6 and 7.

The anti-skid apparatus 5 operates by the so-called return pump principle, and to this end has an anti-skid valve assembly 8, a first pressure fluid holder 9 a return pump 10 a second pressure fluid holder 11, a wheel brake fast-relief one-way valve 12, and a brake pressure source selection valve 13, a check valve 14 and a one-way return pump protection valve 15, all located between the master brake cylinder 4 and the wheel brakes 6 and 7.

The anti-skid valve assembly 8 has an electromagnetically controllable 3/3-way valve having a first connection 16, a second connection 17 and a third connection 18. The first connection 16 can be supplied with brake pressure from the master brake cylinder 4, which forms the first brake pressure source, and in the basic position of the anti-skid valve assembly 8 communicates with the second connection 17, which communicates permanently with the wheel brakes 6 and 7. In a first control position the anti-skid valve assembly 8 disconnects the first connection 16 from the second connection 17. In a second control position, the anti-skid valve assembly 8 likewise disconnects the first connection 16 from the second connection 17, but connects the second connection 17 to the third connection 18. The third connection 18 communicates with both the first pressure fluid holder 9 and one inlet 19 of the return pump 10. For instance, the first pressure fluid holder 9 is embodied in a manner known per se as a so-called piston reservoir and has a spring acting on the piston, the spring is for instance compressible for instance by means of a pressure of substantially 5 bar. The return pump 10 is embodied in a manner known per se and can accordingly be taken from the prior art, for example, and is for instance equipped with an electric motor 20 to drive it. The return pump 10 has an outlet 21, to which the second pressure fluid holder 11 is connected on one side and the check valve 14 on the other. The check valve 14 is associated with the outlet 21 in such a way that it can be opened by means of pressure from the outlet 21. The check valve 14 also communicates with the first inlet 16 of the anti-skid valve assembly 8. The second pressure fluid holder 11 is preferably embodied, in the present exemplary embodiment, as a hollow chamber that is located in some, preferably metal, housing or the like and holds a volume of 40 cm³, for instance. This example of 40 cm³ is a suggested dimension for use in a so-called medium-price car.

The wheel brake fast-relief valve 12 is embodied as a one-way check valve and is connected to the two wheel brakes 6 and 7 the first inlet 23 of the pressure source selection valve and to the master brake cylinder 4 in such a way that on the occasion of a braking event effected by actuation of the brake pedal 3, quantities of pressure fluid that reach the wheel brakes 6 and 7 can be returned to the master brake cylinder 4 by release of the brake pedal 3, even if the anti-skid valve assembly 8 is in its first control position, so that by means of the anti-skid valve assembly alone it is not possible to lower the brake pressure in the wheel brakes 6 and 7 by draining brake fluid to the master brake cylinder 4.

In anti-skid operation, to be described hereinafter, the first pressure fluid holder 9, the return pump 10 and the second pressure fluid holder 11 form a second brake pressure source, which is supplied with pressure fluid from the wheel brakes 6 and 7 by switching the anti-skid valve assembly 8 over into its second position and thus drawing the brake fluid from its third connection 18.

The brake pressure source selection valve 13 is embodied as a hydraulically controllable 2/2-way valve and has an opening spring 22 to secure its basic position. For hydraulic control, the brake pressure source selection valve 13 has a first control inlet 23 and a second control inlet 24. The brake pressure source selection valve 13 is arranged such that control pressure blocked by series-connected one-way brake fast-relief valve 12 directed to the first inlet acts in the opening direction of the brake pressure source selection valve 13, which contrarily controls pressure at the second control inlet 24 to effect closure of this 2/2-way valve 13 whenever the control pressure in the second control inlet 24 exceeds the control pressure prevailing in the first control inlet 23 by 10 bar, for instance. The first control inlet 23 communicates permanently with the master brake cylinder 4, in the exemplary embodiment of FIG. 1. The second control inlet 24 can in principle be supplied with control pressure from the outlet 21 of the return pump 10 as soon as the return pump 10 is switched on and furnishes pressure. For supplying the aforementioned control pressure, a control conduit 25 is for instance provided between the second control inlet 24 and the second pressure fluid holder 11, extending in some way in a housing block. The check valve 14, which because of its construction acts as a self-controlling valve, should also be included as part of the brake pressure source selection valve 13. The self-control property in terms of opening of this check valve 14 is exploited by the return pump 10 whenever it generates pressure by being switched on and as a result can pump pressure fluid to the first inlet 16 of the anti-skid valve assembly 8 in order to elevate brake pressures in the wheel brakes 6 and 7. The brake pressure source selection valve 13 is intended, as a 2/2-way valve conditionally controlled by two control pressures, for selecting the master brake cylinder 4, forming the first brake pressure source, to supply the wheel brakes 6 and 7 for normal braking.

Because of the embodiment and disposition of the check valve 14, a selection of the master brake cylinder 4 as the brake source causes only a filling of the wheel brakes 6 and 7, so that from the standpoint of the brake pressure source selection valve 13, a possibly substantially lower pressure can prevail in the second pressure fluid holder 11 and at the second control inlet 24 than upstream of the brake pressure source selection valve 13 or in its first control inlet 23.

The return pump protection valve 15 is connected arbitrarily to the outlet 21 of the return pump 10, communicates with the master brake cylinder 4, and can be opened toward the master brake cylinder. The return pump protection valve 15 may be embodied as a simple check valve, of the kind symbolically shown in U.S. Pat. No. 4,778,226 discussed above. However, the return pump protection valve 15 in the form of a check valve may also have a closing spring 26 which reliably prevents filling of the second brake pressure source or second pressure fluid holder 11 and the second control inlet 24 with pressure from the first brake pressure source 4. Depending on the design of the closing spring 26, it is attainable, with the return pump 10 operating, to have an intended pressure drop prevail between the outlet 21 and the first brake pressure source 4. The disposition of the closing spring 26 has the advantage that when the return pump 10 is in operation, the pressure in the pressure fluid holder 11 can exceed the pressure prevailing in the master brake cylinder 4 by a preselectable amount and as a result increase both the capacity for holding pressure fluid and the capacity to store energy.

In the normal state, the elements of the anti-skid apparatus 5 described assume the basic positions shown in FIG. 1. Consequently, generation of brake pressure in the master brake cylinder 4 in response to actuation of the brake pedal 3 means that the brake pressure generate there reaches the wheel brakes 6 and 7, through the brake pressure source selection valve 13 and the anti-skid valve assembly 8. To terminate normal braking, the brake pedal is released, allowing quantities of pressure fluid to flow out of the wheel brakes 6 and 7, on the one hand through the anti-skid valve assembly and on the other through the wheel brake fast-relief valve 12 in the direction of the master brake cylinder 4, so that the brake pressures drop.

If the vehicle is braked hard on a road with good traction and then hits an icy patch, then the incipient danger of skidding, recognized via wheel rotation sensors not shown and under the control of a control unit similar to that described in U.S. Pat. No. 4,778,226, causes the anti-skid valve assembly 8 to be switched into the brake pressure reduction position, that is, its second control position. As a result, quantities of pressure fluid flow out of the wheel brakes 6 and 7 through the second connection 17 and third connection 18 of the anti-skid valve assembly 8 into the first pressure fluid holder 9. Because the electric motor 20 of the return pump 10 is switched on at the same time, the return pump evacuates the first pressure fluid holder 9 and as a result charges the second pressure fluid holder 11, via its outlet 21. The resultant, rising pressure at the outlet 21 of the return pump 10 finally reaches the second control inlet 24 of the brake pressure source selection valve 13, through the conduit 25. If the pressure here furnished by the return pump 10 exceeds the pressure that the first brake pressure source 4, or master brake cylinder, furnishes to the first control inlet by at least 10 bar, for example, then the brake pressure source selection valve 13 switches itself into the blocking position and as a result disconnects the anti-skid valve assembly 8 from the first brake pressure source 4, so that temporarily, via the check valve 14, only the second brake pressure source embodied by the return pump 10 and the second pressure fluid holder 11 is available for the anti-skid valve assembly 8. Once the danger of skidding has been overcome by this reduction in brake pressure, the control unit (not shown) can return the anti-skid valve assembly 8 to its first control position or the basic position. In the first instance, the braking of the wheel (not shown) remains constant, because pressure fluid is neither resupplied to the wheel brakes 6 and 7 nor withdrawn from them. Depending on coincidental friction conditions, the wheels may for example be accelerated or slowed down further. If they are adequately accelerated, so that an increase in brake pressure is desired, then the anti-skid valve assembly 8 is directed into its basic position. As a result, pressure fluid from the second pressure fluid holder 11 or simultaneously from the outlet 21 of the return pump 10 as well passes through both the check valve 14 and the anti-skid valve assembly 8 to reach the wheel brakes 6 and 7. The pressure in the second pressure fluid holder 11 can drop in this process. If in this process the controlling pressure in the second control inlet 24 is to be dropped virtually to the pressure prevailing in the first control inlet 23, then under the influence of the opening spring 22 and optionally with the joint help of the pressure from the first brake pressure source 4 prevailing in the first control inlet 23, the brake pressure source selection valve 13 reaches its opening position, and now pressure and pressure fluid from the master brake cylinder 4 are again available to increase brake pressures in the wheel brakes 6 and 7. It will be appreciated that braking when the vehicle is traveling over a surface with a low coefficient of adhesion and leading to anti-skid operation, for example, can then be boosted, once the vehicle leaves this part of the road and reaches a surface with a substantially higher coefficient of adhesion.

If it should happen that the vehicle leaves a part of the road having very good traction, where there is high brake pressure in the wheel brakes 6 and 7, and reaches an icy area of the road, then the anti-skid valve assembly 8 again causes quantities of pressure fluid to flow out of the wheel brakes 6 and 7 into the first pressure fluid holder 9 and to the return pump 10. Since the quantities of pressure fluid then to be diverted from the wheel brakes 6 and 7 may be relatively large and may exceed the capacity of the second pressure fluid holder 11, the return pump protection valve 15 serves to limit an impermissible rise in return pump pressure by diverting quantities of pressure fluid to the master brake cylinder 4. Finally, if the vehicle again reaches a portion of the road that has good traction, then as already described the antiskid valve assembly 8 is returned to its basic position, resulting in increases in brake pressure in the wheel brakes 6 and 7. Since in this process, because of the quantity of pressure fluid previously diverted by the return pump protection valve 15, the pressure in the second pressure fluid holder 11 may drop to markedly below the pressure that the master brake cylinder 4 can furnish, the brake pressure source selection valve 13 is opened in the manner already described, and as a result will carry a pressure, arbitrarily adjustable by means of the pedal 3, onward at least as far as the anti-skid valve assembly 8.

Since the second brake pressure fluid holder 11 can release quantities of pressure fluid very quickly, at least when highly charged by the return pump 10, it cannot be precluded that brake pressures may rise undesirably fast and hence disadvantageously high in the wheel brakes 6 and 7, because of the return of the anti-skid valve 8 to its basic position. To avert disadvantageously fast pressure increases, a throttle 27 may be provided, between a combination, comprising the second pressure fluid holder 11 and the return pump 10, and the check valve 14 that is in series with this combination. If it should coincidentally happen that the return pump 10 is running and a that time the brake pressure source selection valve 13 is supposed to be open for any reason, then the throttle 27 also has the advantage that when there is a flow through it a pressure drop occurs, which assures a control pressure for the second control inlet 24 that leads to the desired case-dependent closure of the brake pressure source selection valve 13.

In addition, it should also be noted that the anti-skid valve assembly 8 shown in the drawing can also be replaced with an anti-skid valve assembly taken from the prior art, for instance a combination of two 2/2-way valves.

In the above description, only brake circuit I was described in association with an anti-skid apparatus 5. An identically embodied anti-skid apparatus 5 may also be assigned to brake circuit II, however.

Figure 2:
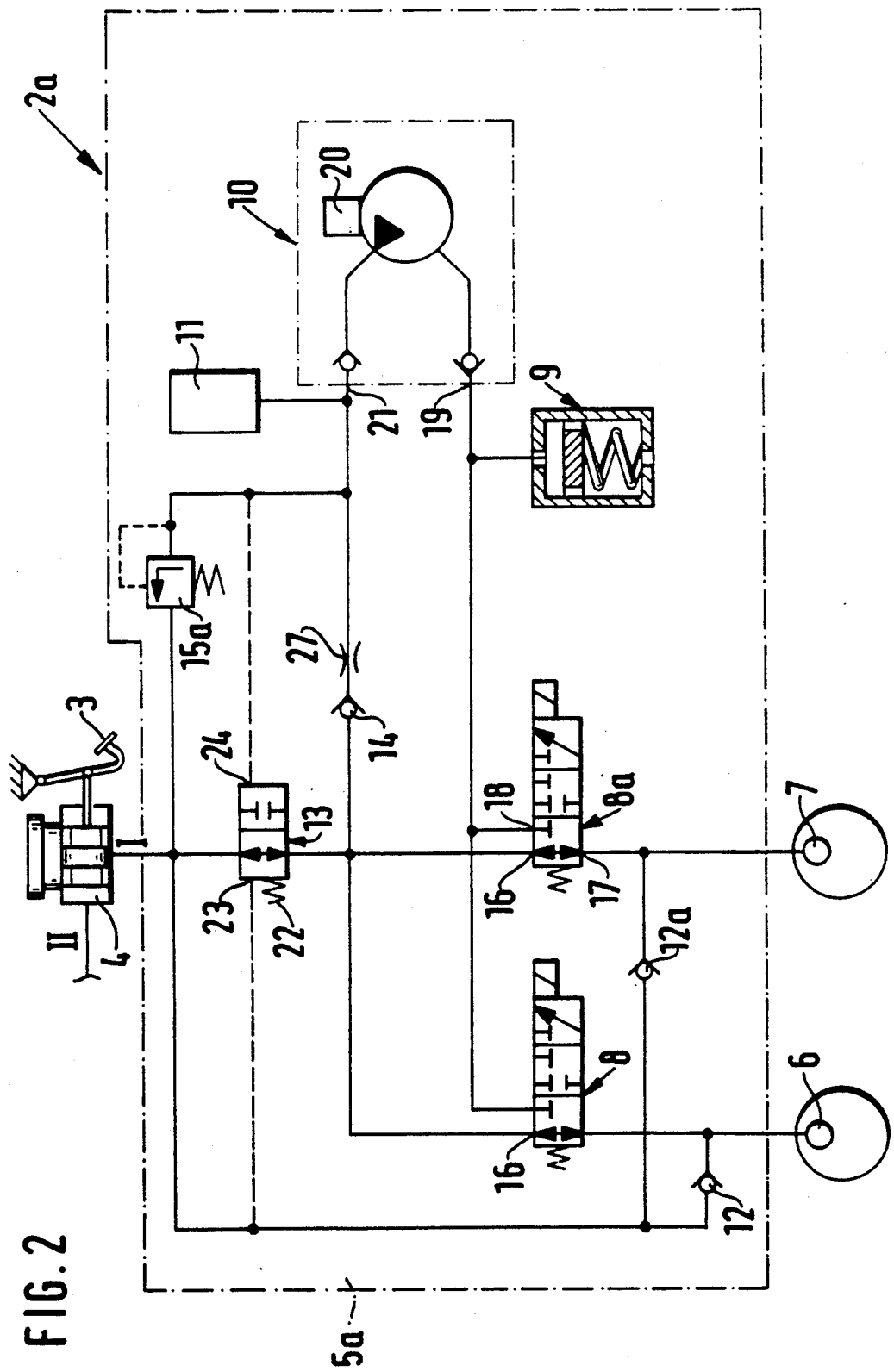
FIG. 2 shows a second exemplary embodiment that is arranged for regulating brake pressure independently of one another in two wheel brakes.

Inside its anti-skid apparatus 5a, the second exemplary embodiment of the vehicle brake system 2a according to the invention shown in FIG. 2 uses the anti-skid valve assembly 8, the first pressure fluid holder 9, the return pump 10, the second pressure fluid holder 11, the wheel brake fast-relief valve 12, the brake pressure source selection valve 13, the check valve 14 and the throttle 27 of the exemplary embodiment of FIG. 1, all for one wheel brake 6. For a further wheel brake 7, an additional anti-skid valve assembly 8a is installed. Instead of the return pump protection valve 15 of FIG. 1, which is shown there as a check valve, a symbolically shown return pump protection valve 15a is now installed that has the property of opening at a fixed return pump pressure, regardless of whether the master brake cylinder acting as the first brake pressure source 4 is furnishing a counterpressure. As a result, the level of the return pump pressure beyond which quantities of pressure fluid can flow out toward the master brake cylinder 4, is no longer subjected to the fluctuations that can be brought about by actuation of the brake pedal 3 in the first exemplary embodiment.

Unlike the exemplary embodiment of FIG. 1, in the exemplary embodiment of FIG. 2 the anti-skid valve assembly 8, as already indicated, is intended solely to supply the wheel brake 6. The wheel brake fast-relief valve 12 is intended for fast relief of the wheel brake 6. The wheel brake 7 has its own anti-skid valve assembly 8a, already mentioned, which is preferably embodied identically to the anti-skid valve assembly 8. The anti-skid valve assembly 8a likewise has a first inlet 16, which communicates with both the brake pressure source selection valve 1 and the check valve 14. A second connection 17 analogously communicates with the wheel brake 6. A third connection 18 likewise communicates with the first pressure fluid holder 9 and the inlet 19 of the return pump 10. For fast relief of the wheel brake 7, this brake is assigned its own wheel brake fast-relief valve 12a, which is embodied identically to the valve 12.

In a manner not shown, each of the wheel brakes 6 and 7 is assigned a wheel rotation sensor (not shown) from the prior art, so that by using a control unit (also not shown) and the two anti-skid valve assemblies 8 and 8a, brake pressures in the wheel brakes 6 and 7 can be adjusted individually, independently of one another. Because the wheel brake pressures are adjustable independently of one another for the wheel brakes 6 and 7, these wheel brakes can for instance be assigned to a front axle of a vehicle, or to one front wheel and one diagonally opposed rear wheel of a vehicle. If the latter arrangement of the wheel brakes 6 and 7 is selected, for one front wheel and one rear wheel, then a further anti-skid apparatus 5a (not shown) is assigned to brake circuit II. Contrarily, if the provision is that the wheel brakes 6 and 7 both belong to a front axle of a vehicle, then an anti-skid apparatus 5a of this FIG. 2, or a more simply embodied anti-skid apparatus 5 of FIG. 1 may be used selectively for brake circuit II.

Figure 3:
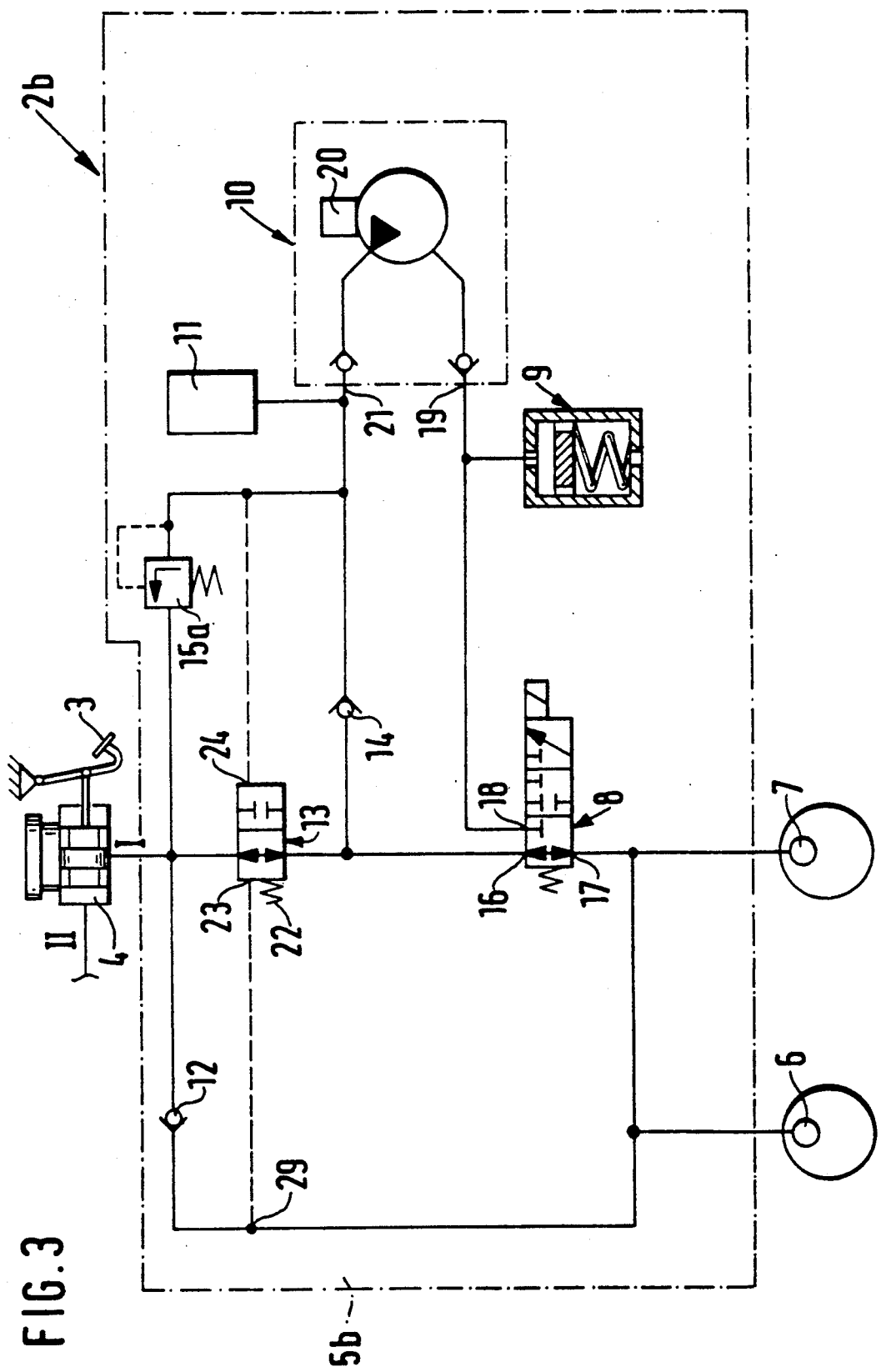
FIG. 3 shows a further exemplary embodiment for simultaneous variation of pressure in two wheel brakes.

The third exemplary embodiment of the vehicle brake system 2b of FIG. 3 uses one joint anti-skid valve assembly 8 for two wheel brakes 6 and 7, as in the exemplary embodiment of FIG. 1, in the anti-skid apparatus 5b. The anti-skid apparatus 5b also includes the already-described first pressure fluid holder 9, the return pump 10, the second pressure fluid holder 11, the wheel brake fast-relief valve 12, the brake pressure source selection valve 13 with its first control inlet 23 and its second control inlet 24, and the check valve 14, along with the return pump protection valve 15a. The difference from the exemplary embodiments described above is that there is a branching point 29 between the wheel brake fast-relief valve 12, which is again openable toward the master brake cylinder 4, and the anti-skid valve assembly 8. The control inlet 23 of the brake pressure source selection valve 13 is connected to this branching point 29. The wheel brake fast-relief valve 12 then communicates, as intended, with the two wheel brakes 6 and 7 via the branching point 29.

During normal braking as a consequence of actuation of the brake pedal 3, the vehicle brake system 2b functions like the exemplary embodiments described above, but with the exception that the brake pressure generated in the master brake cylinder 4 reaches the first control inlet 23 in the form of control pressure by a detour through the brake pressure source selection valve 13 and the anti-skid valve assembly 8. If the anti-skid valve assembly 8 is switched over into its position for reducing brake pressure because the danger of wheel skidding has arisen, then the brake pressure in the two wheel brakes 6 and 7 drops, and as a result the control pressure at the first inlet 23 also drops. This switchover of the anti-skid valve assembly 8 in turn effects a variably extensive filling of the first pressure fluid holder 9, and when the return pump 10 is switched on effects a pressure rise in the second pressure fluid holder 11 and thus in the second control inlet 24 of the brake pressure source selection valve 13. Depending on the magnitude of the pressure rise in the second pressure fluid holder 11, the pressure in the second control inlet 24 can overcome the pressure in the first control inlet 23 and the force of the opening spring 22, so that the next time the brake pressure is raised the wheel brakes 6 and 7 are now supplied not from the master brake cylinder 4 which represents the first brake pressure source but by the second brake pressure source, comprising the first pressure fluid holder 9, the actuated return pump 10, and the second pressure fluid holder 11. The next time the brake pressure is to be raised, the anti-skid valve assembly 8, by switching back into its open basic position, accordingly selects the second brake pressure source via the check valve 14 itself that can be opened by a pressure drop. If on the occasion of this switchover of the anti-skid valve assembly 8 to the open position the pressure in the second pressure fluid holder 11 and accordingly in the second control inlet 24 drops far enough compared with the simultaneously rising pressure in the first control inlet 23, for instance, then the brake pressure source selection valve 13 moves to its open position; as a result the first brake pressure source, that is, the master brake cylinder 4, can generate a possibly allowable brake pressure increase in the wheel brakes 6 and 7 up to a level that is more or less arbitrarily preselected by the driver by actuation of the brake pedal 3. As in the exemplary embodiments already described, the return pump protection valve 15a once again serves to protect the return pump 10 as well as the second pressure fluid holder 11 from an overload by allowing quantities of pressure fluid to flow out to the master brake cylinder 4. Since the original brake pressure from filling the wheel brakes from the second brake pressure source is no longer attainable by draining out the quantities of pressure fluid, the pressure at the control inlet 24 in turn drops so far relative to the pressure in the first control inlet 23 that the anti-skid apparatus 5b now selects the first brake pressure source, that is, the master brake cylinder, to supply the wheel brakes 6 and 7.

The different kind of disposition of the check valve 12 in FIG. 3 compared with FIG. 1, between the master brake cylinder 4 and the first control inlet 23 of the brake pressure source selection valve 13 has the advantage over the exemplary embodiments of FIGS. 1 and 2 that the blockage by means of the brake pressure source selection valve 13 already takes place once the return pump 10 begins to pump, as a consequence of a lowering of brake pressure effected by means of the anti-skid valve assembly 8, and generates a pressure that is greater than the instantaneous wheel brake pressure. On the other hand, the brake pressure source selection valve 13 already assumes it opening position whenever the pressure at the outlet 21 of the return pump has dropped substantially to the pressure of the wheel brakes 6, 7. This takes place independently of the pressure that meanwhile prevails in the master brake cylinder 4, as long as this pressure is greater than the pressure prevailing in the wheel brake.

Figure 4:
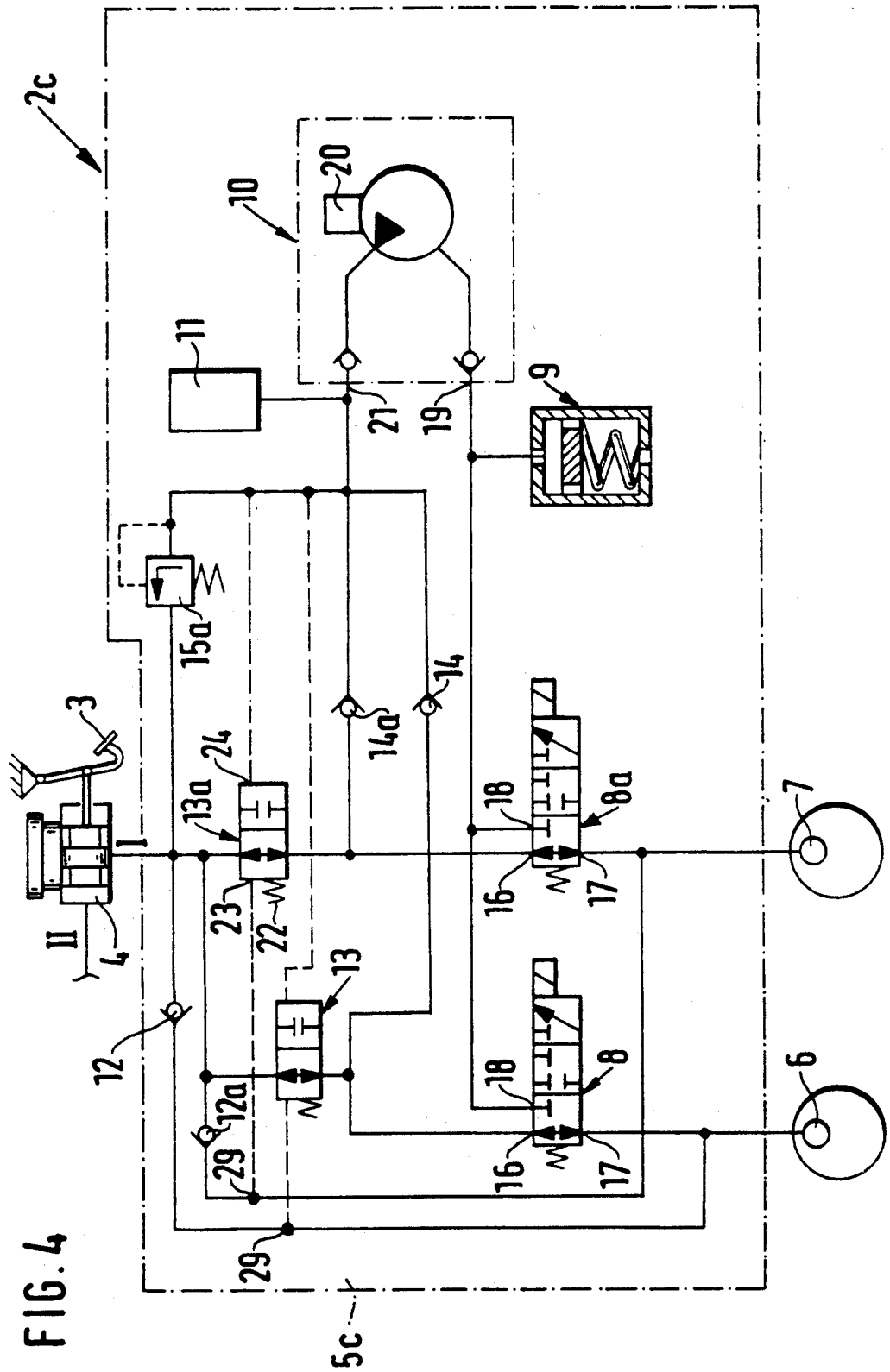
FIG. 4 is a further feature of the exemplary embodiment of FIG. 3 for mutually independent regulation of pressure in two vehicle brakes.

The fourth exemplary embodiment of the vehicle brake system 2c of FIG. 4 differs from that described in conjunction with FIG. 3 in that as in the exemplary embodiment of FIG. 2, each of the wheel brakes 6 and 7 has an individually assigned anti-skid valve assembly 8 and 8a, respectively. Logically, two wheel brake fast-relief valves 12 and 12a and two brake pressure source selection valves 13, 13a and two check valves 14, 14a are also provided. The resultant different embodiment of the anti-skid apparatus 5c compared with the anti-skid apparatus 5b has the advantage, already defined in conjunction with the anti-skid apparatus 5a, of the independent adjustability of brake pressures in wheel brakes 6 and 7. The likewise independently controllable brake pressure source selection valves 13 and 13a then have the effect that each of the wheel brakes 6 or 7 can be supplied in anti-skid operation with pressure fluid from the first brake pressure source 4 on a case-by-case basis.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the U.S. is:

1. A vehicle brake system comprising a master brake cylinder embodying a first brake pressure source, at least one wheel brake suppliable from the master brake cylinder, at least one anti-skid apparatus including an anti-skid valve assembly (8, 8a) between the master brake cylinder and the wheel brake, a return pump (10) with an inlet and an outlet serving as a second brake pressure source, a first pressure fluid holder (9) communicating with the inlet of the return pump for holding pressure fluid from the wheel brake through the anti-skid valve assembly, a fillable second pressure fluid holder (11) embodied as a hollow chamber defined by a substantially rigid wall connected to the outlet of the return pump, a throttle (27) disposed downstream of the second pressure fluid holder (11) in a direction toward the anti-skid valve assembly (8, 8a), a brake pressure source selection valve (13) and a return pump pressure drop protection valve (15, 15a) which is operative between the outlet of the return pump and the master brake cylinder, the brake pressure source selection valve (13) is embodied as a hydraulically controllable 2/2-way valve disposed between the first brake pressure source (4) and the anti-skid valve assembly (8, 8a), having at least one opening spring (22) and a first control inlet (23) and a second control inlet (24) and having a check valve (14) that is openable in the direction of the anti-skid valve assembly (8, 8a) by a pressure drop, said check valve (14) is located downstream of the second brake pressure source; said first control inlet (23) of the 2/2-way valve communicates permanently with the first brake pressure source (4) and the second control inlet (24) communicates permanently with the second brake pressure source 910, 11); and the 2/2-way valve (13) is embodied such that it assumes its closing position when the pressure in the second control inlet (24) is higher, by a preselected variable, than the pressure in the first control inlet (23).

2. A vehicle brake system as defined by claim 1, in which the wall comprises metal.

3. A vehicle brake system as defined by claim 2, in which the hollow chamber contains a volume of substantially 40 cm$^3$.

4. A vehicle brake system as defined by claim 1, in which the hollow chamber contains a volume of substantially 40 cm$^3$.

5. A vehicle brake system as defined by claim 1, in which the return pump protection valve (15a) is embodied as a valve that can be opened as a function of an absolute return pump pressure.

6. A vehicle brake system as defined by claim 1, in which the return pump protection valve (15) is embodied as a check valve loaded with at least one closing spring (26).

7. A vehicle brake system comprising a master brake cylinder embodying a first brake pressure source, at least one wheel brake suppliable from the master brake cylinder, at least one anti-skid apparatus, including an anti-skid valve assembly between the master brake cylinder and the wheel brake, a return pump with an inlet and an outlet serving as a second brake pressure source, a first pressure fluid holder communicating with the inlet of the return pump for holding pressure fluid from the wheel brake through the anti-skid valve assembly, a fillable second pressure fluid holder embodied as a hollow chamber defined by a substantially rigid wall connected to the outlet of the return pump, and a brake pressure source selection valve and a return pump pressure drop protection valve which is operative between the outlet of the return pump and the master brake cylinder, the brake pressure source selection valve (13, 13a) is embodied as a hydraulically controllable 2/2-way valve disposed between the first brake pressure source (4) and the anti-skid valve assembly (8, 8a), having at least one opening spring (22) and a first control inlet (23) and a second control inlet (24), a check valve (14) that is openable in the direction of he anti-skid valve assembly (8, 8a) by a pressure drop, said check valve (14) is located downstream of the second brake pressure source (10, 11); the first control inlet (23) of the 2/2-way valve (13) is connected to the first brake pressure source (4); a check valve (12, 12a) is openable toward this brake pressure source and communicates permanently with at least one wheel brake (6, 7) to supply it with controlling brake pressure; the 2/2-way valve (13) is embodied such that it assumes its closing position when the pressure in the second control inlet (24) is higher, by a preselected variable, than the pressure in the first control inlet (23).

8. A vehicle brake system as defined by claim 7, in which for two wheel brakes (6, 7), two separate anti-skid valve assemblies (8, 8a) and separate wheel brake fast-relief valves (12, 12a) are provided, and that each of the wheel brakes (6, 7) communicates with a first control inlet (23) of a separate brake pressure source selection valve (13 or 13a).

9. A vehicle brake system as defined by claim 8, in which the 2/2-way valve (13) is arranged such that it switches to the blocking position in response to a control pressure excess of substantially 10 bar in the second control inlet (24) relative to the control pressure in the first control inlet (23).

10. A vehicle brake system as defined by claim 8, in which the return pump protection valve (15a) is embodied as a valve that can be opened as a function of an absolute return pump pressure.

11. A vehicle brake system as defined by claim 7, in which the 2/2-way valve (13) is arranged such that it switches to the blocking position in response to a control pressure excess of substantially 10 bar in the second control inlet (24) relative to the control pressure in the first control inlet (23).

12. A vehicle brake system as defined by claim 7, in which the return pump protection valve (15a) is embodied as a valve that can be opened as a function of an absolute return pump pressure.

13. A vehicle brake system comprising a master brake cylinder embodying a first brake pressure source, at least one wheel brake suppliable from the master brake cylinder, at least one anti-skid apparatus including an anti-skid valve assembly between the master brake cylinder and the wheel brake, a return pump with an inlet and an outlet serving as a second brake pressure source, a first pressure fluid holder communicating with the inlet of the return pump for holding pressure fluid from the wheel brake through the anti-skid valve assembly, a fillable second pressure fluid holder connected to the outlet of the return pump, and to a brake pressure source selection valve and a return pump protection valve which is operative between the outlet of the return pump and the master brake cylinder, the brake pressure source selection valve (13) is embodied as a hydraulically controllable 2/2-way valve disposed between the first brake pressure source (4) and the anti-skid valve assembly (8, 8a), having at least one opening spring (22) and a first control inlet (23) and a second control inlet (24) and having a check valve (14) that is openable in the direction of the anti-skid valve assembly (8, 8a) by a pressure drop, said check valve (14) is located downstream of the second brake pressure source; said first control inlet (23) of the 2/2-way valve communicates permanently with the first brake pressure source (4) and the second control inlet (24) communicates permanently with the second brake pressure source (10, 11); and the 2/2-way valve (13) is embodied such that said 2/2-way valve switches to the blocking position in response to a control pressure in excess of substantially 10 bar in the second control inlet (24) relative to the control pressure in the first control inlet (23).

14. A vehicle brake system as defined by claim 13, in which the second pressure fluid holder (11) is embodied as a hollow chamber defined by a substantially rigid wall.

* * * * *